United States Patent
Hosoda

(10) Patent No.: US 11,707,899 B2
(45) Date of Patent: Jul. 25, 2023

(54) VULCANIZATION MOLD FOR TIRE AND METHOD FOR MANUFACTURING TIRE

(71) Applicant: Sumitomo Rubber Industries, Ltd., Kobe (JP)

(72) Inventor: Yasuhiro Hosoda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 323 days.

(21) Appl. No.: 17/001,085

(22) Filed: Aug. 24, 2020

(65) Prior Publication Data

US 2021/0107245 A1    Apr. 15, 2021

(30) Foreign Application Priority Data

Oct. 15, 2019   (JP) ................. 2019-188555

(51) Int. Cl.
    *B29D 30/06*    (2006.01)
    *B29C 33/42*    (2006.01)
    *B60C 11/12*    (2006.01)
    *B60C 11/03*    (2006.01)

(52) U.S. Cl.
    CPC ........ *B29D 30/0606* (2013.01); *B29C 33/424* (2013.01); *B60C 11/12* (2013.01); *B29D 2030/0612* (2013.01); *B29D 2030/0613* (2013.01); *B60C 2011/0341* (2013.01)

(58) Field of Classification Search
    CPC ........ B29D 30/0606; B29D 2030/0622; B29D 30/0629; B29D 2030/0613
    See application file for complete search history.

(56) References Cited

U.S. PATENT DOCUMENTS

| | | |
|---|---|---|
| 2013/0328240 A1 | 12/2013 | Takahashi |
| 2019/0009486 A1* | 1/2019 | Massoptier-David ............. B29D 30/0605 |
| 2019/0022965 A1 | 1/2019 | Kamada |
| 2022/0063220 A1* | 3/2022 | Ouamane ........... B29D 30/0606 |
| 2022/0194037 A1* | 6/2022 | Singer ................ B60C 11/0311 |

FOREIGN PATENT DOCUMENTS

| | | |
|---|---|---|
| DE | 32 18 219 A1 | 11/1983 |
| DE | 10 2008 034 004 A1 | 2/2009 |
| DE | 10 2007 043 715 A1 | 3/2009 |
| EP | 2 821 212 A2 | 1/2015 |
| JP | 2002-347033 A | 12/2002 |
| JP | 2013-252690 A | 12/2013 |
| WO | WO 2010/030276 A1 | 3/2010 |

OTHER PUBLICATIONS

Extended European Search Report for European Application No. 20200665.6, dated Feb. 16, 2021.

* cited by examiner

*Primary Examiner* — Alison L Hindenlang
*Assistant Examiner* — Alexander A Wang
(74) *Attorney, Agent, or Firm* — Birch, Stewart, Kolasch & Birch, LLP

(57) ABSTRACT

A vulcanization mold is for a tire in which a plurality of sipes are arranged in a tire circumferential direction. The vulcanization mold includes a tread mold having a plurality a blades, for forming the sipes, provided on a tread forming surface. The tread mold is composed of a plurality of segments divided in the tire circumferential direction such that the segments are movable in a tire radial direction, and the number of divisions of the segments is 17 or more and 29 or less.

20 Claims, 9 Drawing Sheets

VULCANIZATION MOLD FOR TIRE AND METHOD FOR MANUFACTURING TIRE

TECHNICAL FIELD

The present invention relates to a vulcanization mold for a tire having a tread portion in which a plurality of sipes are arranged in the tire circumferential direction, and a method for manufacturing the tire.

BACKGROUND ART

In tires such as studless tires and snow tires, a plurality of sipes arranged the tire circumferential direction are formed on an outer surface of the tread portion in order to improve on-ice performance.

This type of tire is vulcanization molded by a vulcanizing mold including an annular tread mold. The tread mold has a tread forming surface firm forming the outer surface of the tread portion, and a plurality of blades, for forming sipes, protruding from the tread forming surface. Further, the tread mold is composed of a plurality of segments divided in the tire circumferential direction by dividing surfaces.

Here, each of the blades protrudes inward in the tire radial direction toward the tire axis. Further, each of the segments moves outward in the tire radial direction in order to remove the tire from the vulcanization mold. Therefore, in each of the blades arranged on the dividing surface side of the segments an angle difference is generated between the protruding direction and the moving direction of the segment.

Therefore, when the tires is removed, there is a problem that the blades arranged on the dividing surface side of the segments receive a large bending force from the rubber of the tire and is damaged by curving or bending. Such damage is more obvious when the thickness of each of the blades is as thin as 0.6 mm or less, when each of the blades is a three-dimensional blade that extends in a zigzag shape in the lengthwise direction and the height direction, and when the height of each of the blades from the tread forming surface is 15 mm or more.

Therefore, in Patent Document 1 below, it is proposed to make the thickness of the blades arranged in the end region on the side of the dividing surface larger than the thickness of the blades arranged in the central region which is the remaining portion other than the end regions.

PRIOR ART DOCUMENT

Patent Document

Patent Document 1
Japanese Unexamined Patent Application Publication No. 2013-252690

SUMMARY OF THE INVENTION

Problems to be Solved by the Invention

However, in the proposed vulcanization mold described above, wide sipes formed by the blades provided in the end regions and narrow sipes formed by the blades provided in the central regions are arranged alternately in the tire circumferential direction. Therefore, the rigidity of the tread portion becomes uneven in the tire circumferential direction, which causes a new problem that uneven wear occurs in the tire circumferential direction.

The present invention was made in view of the above, and a primary object thereof is to provide a vulcanizing mold for tire and a method for manufacturing the tire capable of suppressing uneven wear in the tire circumferential direction by uniformizing the rigidity of the tread portion in the tire circumferential direction while suppressing damage such as curving and bending of the blades arranged on the dividing surface side of the segments.

Means for Solving the Problems

One aspect of the present invention is a vulcanization mold for tire having a tread portion in which a plurality of Sipes are arranged in a tire circumferential direction, including a tread mold having a tread forming surface for forming an outer surface of the tread portion and a plurality of blades, for forming the sipes, provided on the tread forming surface, wherein the tread mold is composed of a plurality of segments divided in the tire circumferential direction by dividing surfaces such that the segments are movable in a tire radial direction, and the number of divisions of the segments is 17 or more and 29 or less.

In the vulcanization mold according to the present invention, it is preferred that in each of the segments, in a cross section passing through the blades and taken parallel with a tire equator, the blades arranged in end regions on the dividing surface sides have the same thickness and the same heights as those of the blades arranged in a central region defined between the end regions.

In the vulcanization mold according to the present invention, it is preferred that the blades are three-dimensional blades each extending in a zigzag shape in a length direction and a height direction of the blade.

In the vulcanization mold according to the present invention, it is preferred that each of the blades has thickness of 0.6 mm or less.

In the vulcanization mold according to the present invention, it is preferred that each of the blades has a height of 13.0 min or more from the tread forming surface.

In the vulcanization mold according to the present invention, it is preferred that the number of divisions is a prime number.

In the vulcanization mold according to the present invention, it is preferred that the number of divisions is 19.

Another aspect of the present invention is a method for manufacturing a tire including a step of vulcanizing a tire by using any of the above-described vulcanization mold.

Effects of the Invention

In the vulcanizing mold for tire according to the present invention, the number of divisions of the segments forming the tread mold is regulated to 17 or more. On the other hand, conventionally, the number of divisions of the segments is generally in the range of 8 to 10.

Here, when compared, by an angle difference between the dividing surface and the moving direction of the segment, instead of the angle difference between the protruding direction of the blade arranged closest to the dividing surface and the moving direction of the segment, the angle difference in the conventional case (the number of divisions is from 8 to 10 is from 18.0 to 22.5 degrees, whereas in the present embodiment (the number of divisions is 17 or more), the angle difference can be decreased to 10.6 degrees or less.

That is, when removing the tire, the bending force received by the blades arranged on the dividing surface sides can be greatly decreased, therefore, damage such as curving and bending of the blades can be suppressed. Such an effect of suppressing damage is particularly effectively exerted when the thickness of the blades is as thin as 0.6 mm or less, when the blades are three-dimensional blades, and when each of the heights of the blades is 15 mm or more.

Moreover, in the present invention, it is not necessary to increase the thickness of the blades on the dividing surface sides or decrease the protruding heights thereof in order to suppress the damage. Therefore, it is possible to expect an effect that the rigidity difference in the tire circumferential direction can be suppressed.

Further, as will be described in "Mode for carrying out the invention", by setting the number of divisions to 17 or more, while suppressing an increase in higher-order components of RRO, the O.A, of RRO and middle-order components (for example, the 8th order component) of RRO can be decreased, for example.

Therefore, by the combination of the effect of largely decreasing O.A. of RRO and the middle-order components of RRO and the effect of the blades provided in the segments having the same thickness and the same protruding heights, the uneven wear in the tire circumferential direction can be suppressed more effectively.

MODE FOR CARRYING OUT THE INVENTION

An embodiment of the present invention will now be described in conjunction with accompanying drawings.

Figure 1:
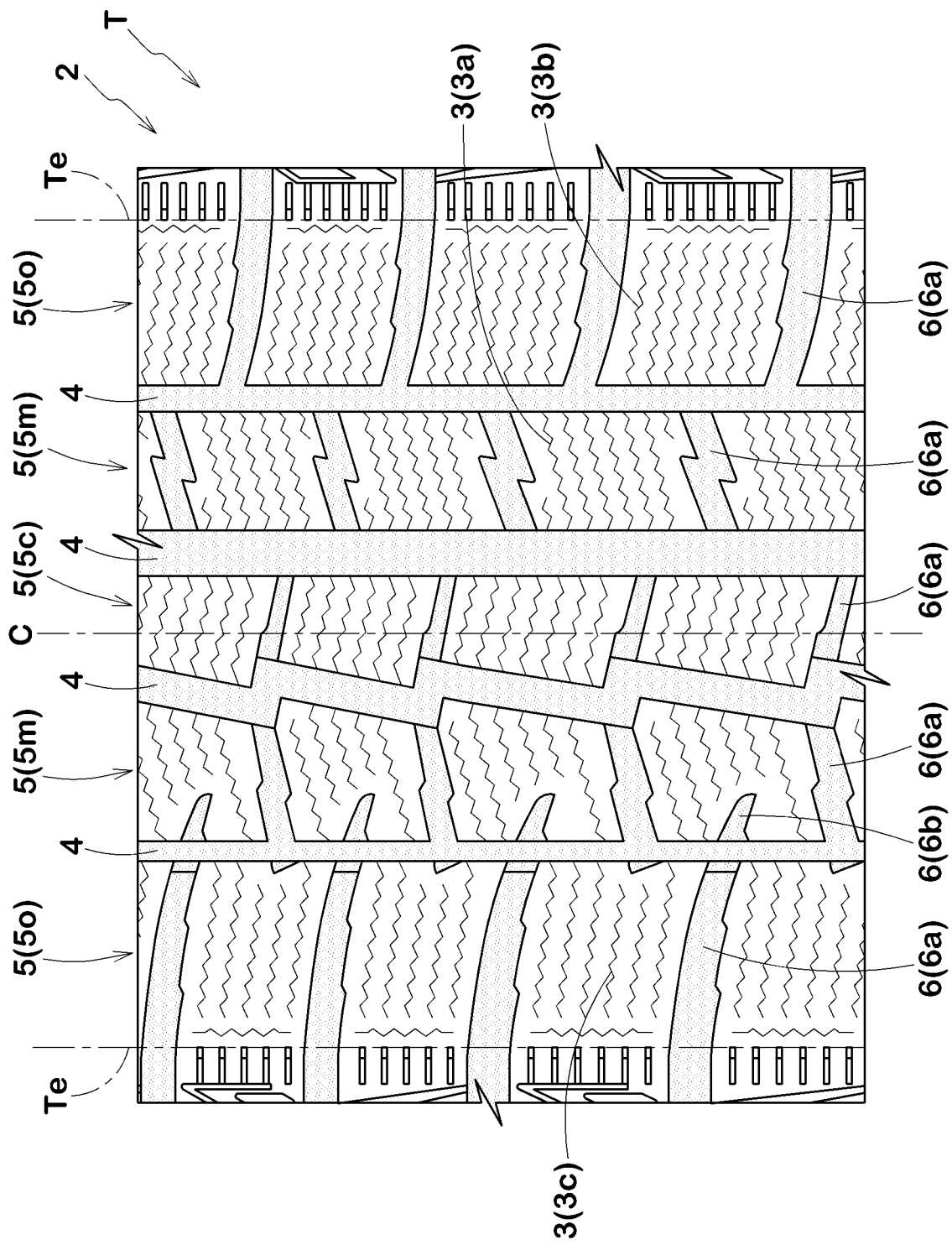
FIG. 1 a development view of an example of the tread portion of a tire manufactured by using the vulcanization mold according to the present invention.

FIG. 1 shows a development view of a tread portion 2 of a tire (T) manufactured by using a vulcanization mold 1 (shown in FIG. 2) according to the present invention.

As shown in FIG. 1, the tread portion 2 is provided with a plurality of sipes 3 arranged in a tire circumferential direction. In the present embodiment, the tread portion 2 is provided with a plurality of (four, for example) circumferential grooves 4 extending in a tire circumferential direction, and the tread portion 2 is divided by the circumferential grooves 4 into a plurality of (five, for example) rib-shaped land regions 5 extending in the tire circumferential direction. Then, at least one of the rib-shaped land regions 5, each of the rib-shaped land regions 5 in the present embodiment, is provided with a plurality of the sipes 3 arranged in the tire circumferential direction.

As the rib-shaped land regions 5, a case is shown where an inner rib-shaped land region (5*c*) arranged on a tire equator (C), outer rib-shaped land regions (5*o*) each arranged closest to a respective one of tread edges (Te), and middle rib-shaped land regions each arranged between the inner rib-shaped land region (5*c*) and a respective one of the outer rib-shaped land regions (5*o*) are formed, for example. In the present embodiment, each of the rib-shaped land regions 5 is provided with a plurality of the sipes 3 and lateral grooves 6 extending in a direction intersecting with the circumferential grooves 4.

Examples of the lateral grooves 6 include open lateral grooves (6*a*) each extending so as to cross the respective rib-shaped land region 5 and semi-open lateral grooves (6*b*) each having one end as a closed terminating end portion terminating within the respective rib-shaped land region 5. These lateral grooves (6*a*) and (6*b*) are appropriately selected and formed according to the required performance of the tire.

Examples of the sipes 3 include open sipes (3*a*) each extending so as to cross the respective rib-shaped land region 5, semi-open sipes (3*b*) each having one end as a closed terminating end portion terminating within the respective rib-shaped land region 5, and closed sipes (3*c*) each having both ends as closed terminating end portions terminating within the respective rib-shaped land region 5. These sipes (3*a*), (3*b*), and (3*c*) are appropriately selected and formed according to the required performance of the tire.

In the present embodiment, a case is shown in which the tread pattern including the circumferential grooves 4, the lateral grooves 6, and the sipes 3 is formed in an asymmetrical manner with respect to the tire equator (C). However, various tread patterns can be employed, and for example, a pattern having left-right symmetry (including line symmetry and point symmetry) can also be preferably employed.

Figure 2:
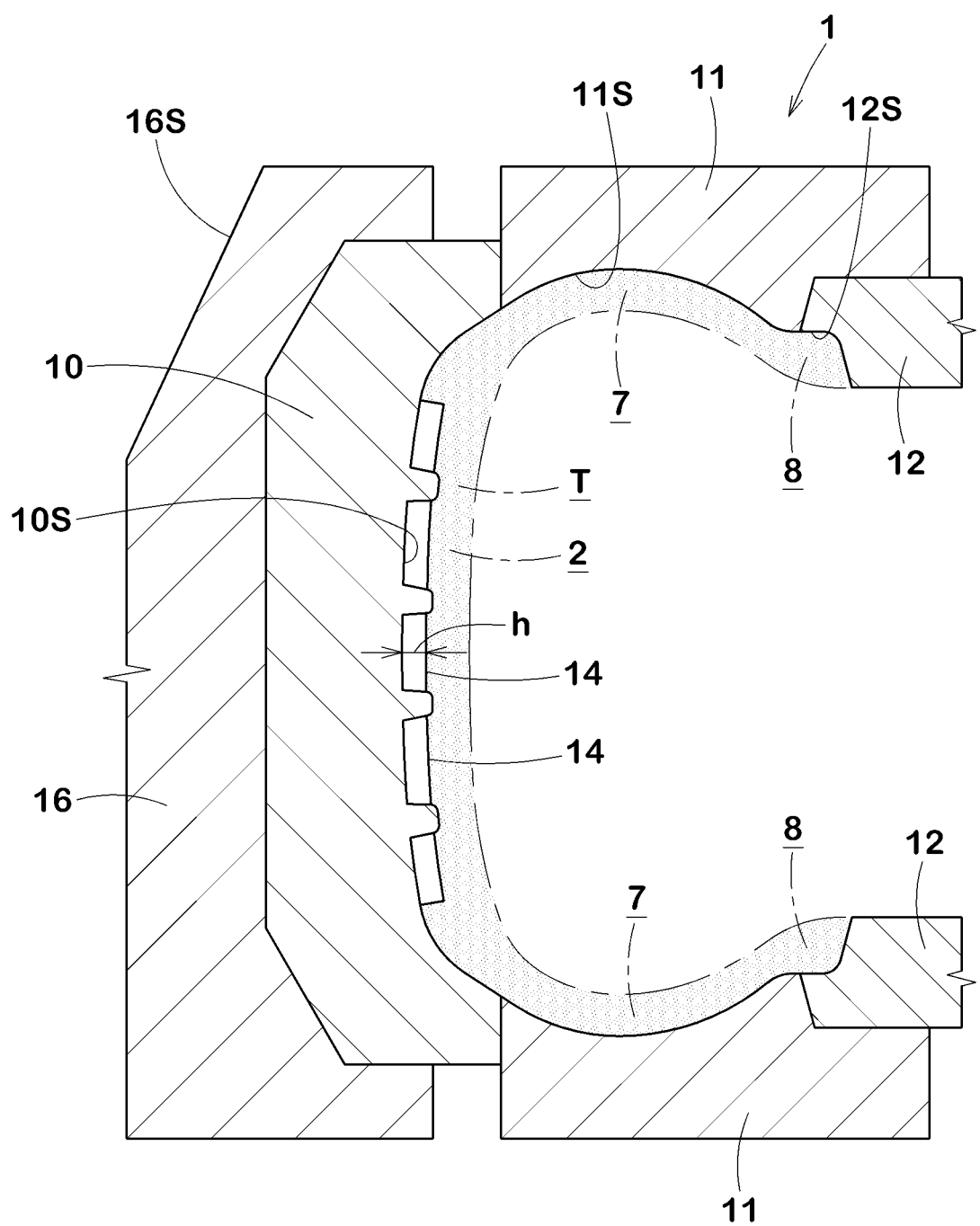
FIG. 2 a meridian section showing the main part of the vulcanization mold.

FIG. 2 shows a meridian section of the vulcanization mold 1 for vulcanizing the tire (T) according to one embodiment of the present invention. As shown in FIG. 2, the vulcanization mold 1 includes a tread mold 10 for forming the tread portion 2 of the tire (T), a pair of side molds 11 for forming sidewall portions 7 of the tire (T), and a pair of bead molds 12 for forming bead portions 8 of the tire (T).

The side molds 11 have sidewall forming surfaces (11S) for forming the outer surfaces of the sidewall portions 7. The bead molds 12 have bead forming surfaces (12S) for forming the outer surfaces of the bead portions 8. The side molds 11 and the bead molds 12 have an annular shape, for example, and are supported so as to be movable in a tire axial direction via, for example, platen plates (not shown).

The tread mold 10 has an annular shape, and, on the inner circumferential surface side thereof a tread forming surface (10S) for forming the outer surface of the tread portion 2 and a plurality of blades 14 provided on the tread forming surface (10S) are arranged.

The blades 14 have a thin plate shape and are planted on the tread forming surface (10S). The blades 14 are pulled out from a tread rubber when the mold is opened, therefore, the sipes 3 are formed as an inverted shape of the blades 14. In order to maintain tread rigidity high, it is preferred that a thickness (t) (not shown) of each of the blades 14 is 0.6 mm or less. It is preferred that the lower limit of the thickness (t) is 0.2 mm or more in order to ensure the rigidity and strength of the blades 14.

Even though it depends on the tire size and category, but in the case of heavy-duty tires, it is preferred that each of heights (h) of the blades 14 from the tread forming surface (10S) is 15 mm or more, and even 17 mm or more from the point of view of exerting the on-ice performance over a long period of time. It should be noted that the upper limit of each of the heights (h) is preferably smaller than or equal to each of groove depths of the circumferential grooves 4.

Figure 3:
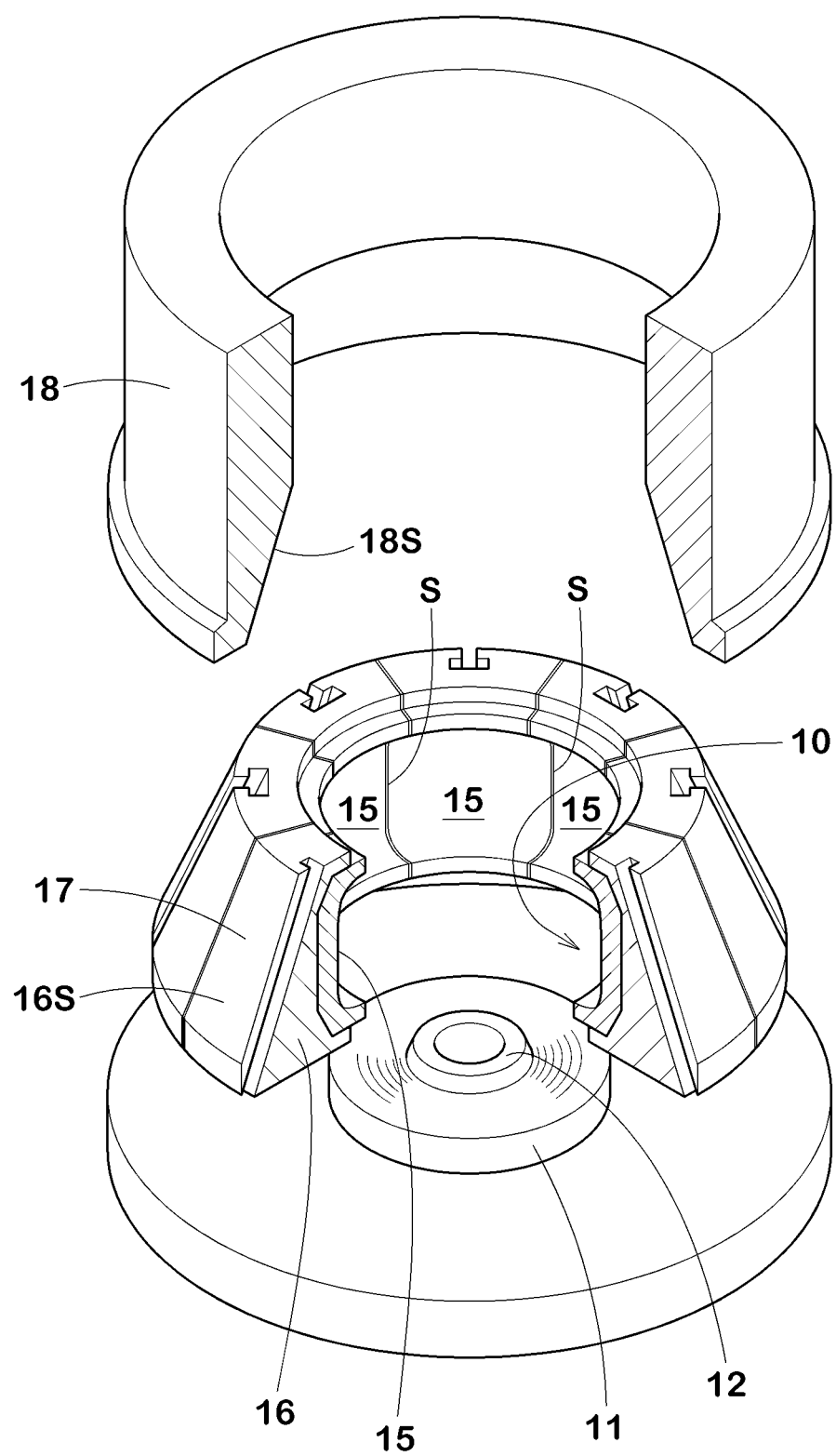
FIG. 3 an exploded perspective view showing the main part of the vulcanization mold.
Figure 4:
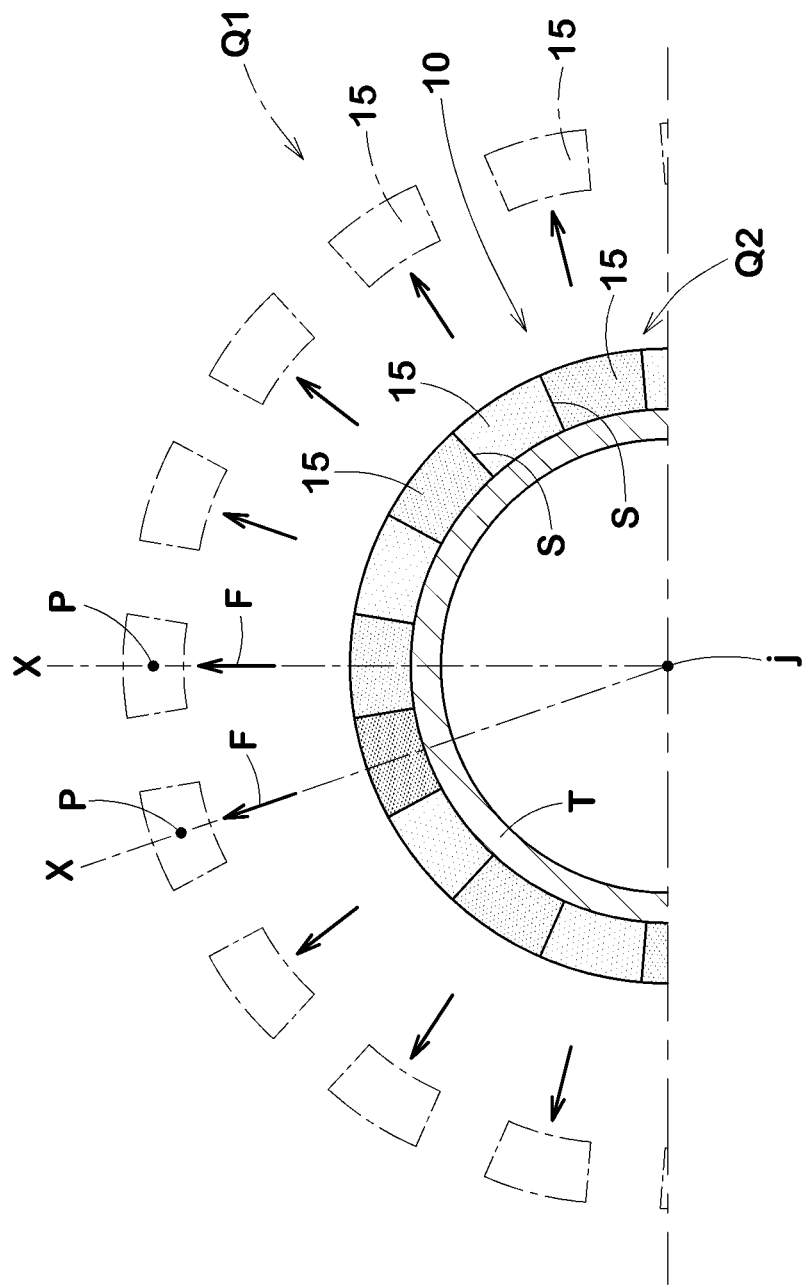
FIG. 4 a cross-sectional view showing the tread mold and taken in a direction perpendicular to the tire axis.

As shown in FIGS. 3 and 4, the tread mold 10 is composed of a plurality of segments 15 divided in the tire circumferential direction by dividing surfaces (S). As shown in FIG. 3, each of the segments 15 is held inside a respective one of sector shoes 16 in a radial direction. The number of the sector shoes 16 is the same as the number of divisions of the segments 15.

A radially outer surface (16S) of each of the sector shoes 16 forms a part of a conical surface 17 which has a diameter decreasing upward. The outer surfaces (16S) are guided to a conical inner surface portion (18S) of a ring-shaped actuator 18 via slide keys (not shown), for example.

Therefore, each of the segments 15, along with the sector shoes 16, can move radially inward and outward between a mold open state (Q1) (shown in a) and a mold closed state (Q2) (shown in FIG. 4) as the ring-shaped actuator 18 moves up and down. Then, in the mold open state (Q1), the segments 15 are separated from each other, and the tire (T) can be taken out from the vulcanization mold 1.

Figure 6:
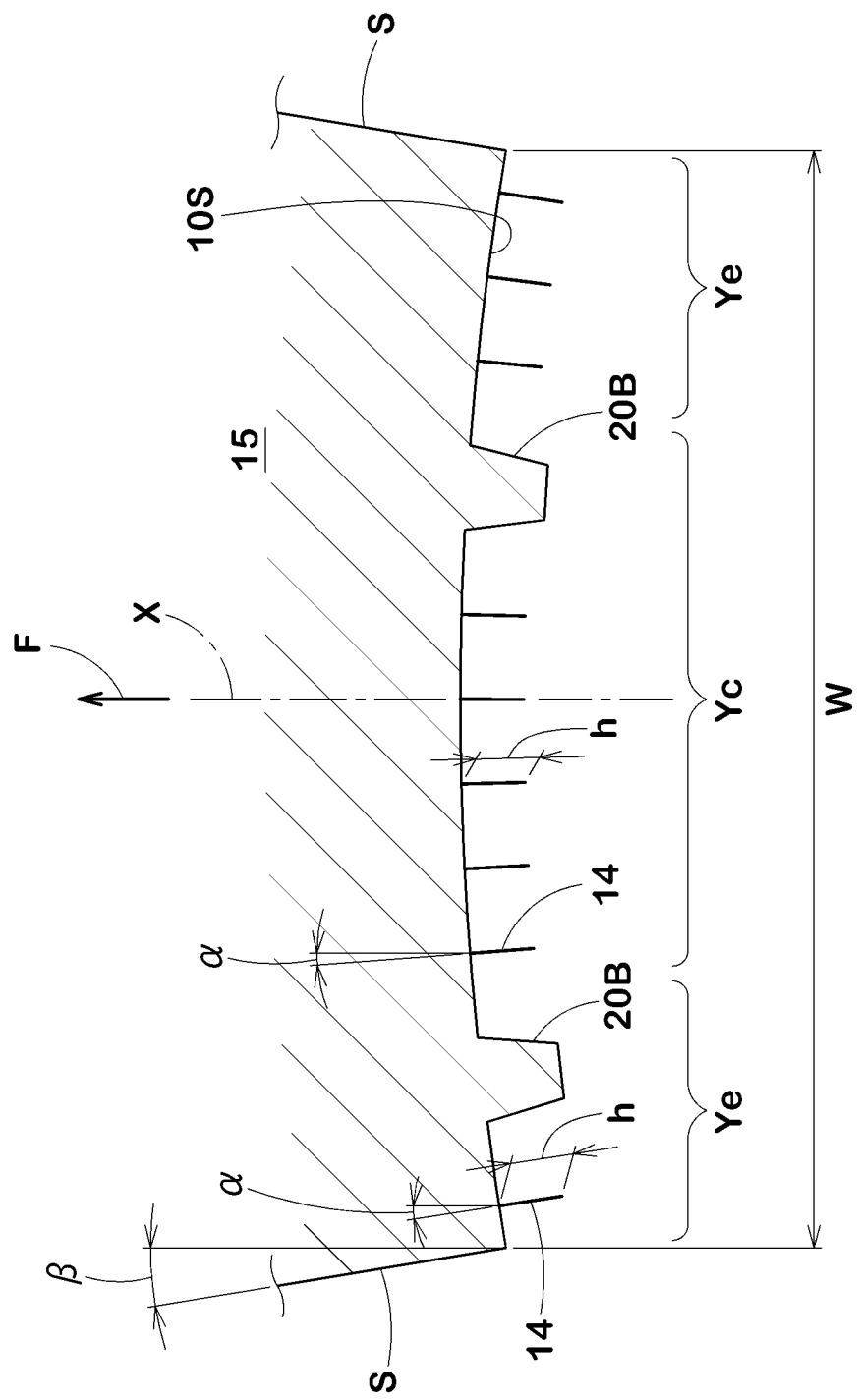
FIG. 6 a cross-sectional view taken along G-G line of FIG. 5.

As shown in FIGS. 4 and 6, each of the segments 15 is movable radially inward and outward in the tire radial direction along a reference line (X) obtained by connecting a middle position (P) of a circumferential length of the respective segment 15 and a tire axis (j).

Figure 5:
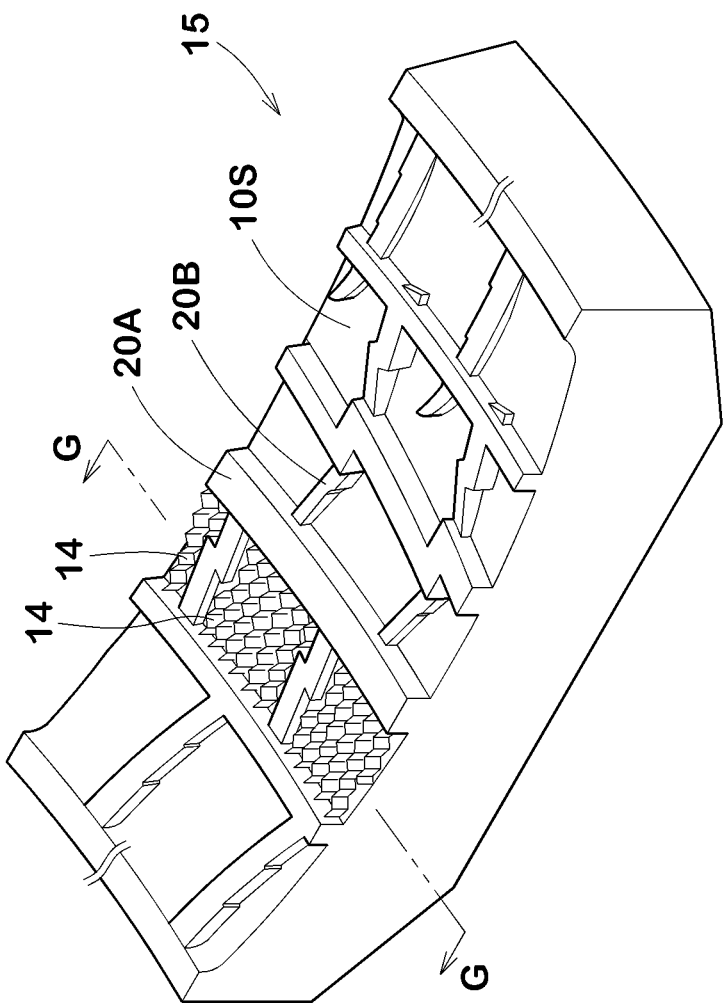
FIG. 5 a perspective view showing one of the segments.

As shown in FIG. 5, each of the segments 15 is provided on the tread forming surface (10S) with a plurality of the blades 14 arranged in the tire circumferential direction. Note that, in FIG. 5, the blades 14 are shown with a part omitted for simplification. On the tread forming surface (10S) of the present embodiment, in addition to the blades 14, groove forming protrusions (20A) for forming the circumferential grooves 4 and groove forming protrusions (20B) for forming the lateral grooves 6 are also formed.

FIG. 6 shows a cross section taken along G-G line of FIG. 5. As shown in FIG. 6, each of the blades 14 protrudes radially inward from the tread forming surface (10S) toward the tire axis (j).

Here, each of the blades 14 protrudes radially inward, whereas the segments 15 move in the tire radial direction along the reference line (X).

Thereby, the closer blade 14 to the dividing surface (S) of the segment 15 has a larger angle difference (α) between the protruding direction of the blade 14 and a moving direction (F) of the segment 15, therefore, the bending force received from the tread rubber when removing the tire (T) becomes larger.

In the present embodiment, the number of divisions of the segments 15 is restricted to a range of 17 to 29, which is larger than the conventional number.

For example, when compared by an angle difference (β) between the dividing surface (S) and the moving direction (F) of the segment 15, instead of the angle difference (α) between the protruding direction of the blade 14 arranged closest to the dividing surface (S) and the moving direction (F) of the segment 15, the angle difference (β) in the conventional case (the number of divisions is from 8 to 10) is from 18.0 to 22.5 degrees, whereas in the present embodiment (the number of divisions is 17 or more), the angle difference (β) can be decreased to 10.6 degrees or less.

That is, when removing the tire, the bending force received by the blades 14 arranged on the dividing surface (S) sides cart be greatly decreased, therefore, damage such as curving and bending of the blades 14 can be suppressed.

In each of the segments 15 of the present embodiment, in a cross section passing through the blades 14 and taken parallel with the tire equator (C) (FIG. 6, for example), the blades 14 arranged in end regions (Ye) positioned on the dividing surface (S) sides have the same thickness (t) and the same protruding heights (h) as those of the blades 14 arranged in a central region (Yc) between the end regions (Ye). In other words, in each of the segments 15, the blades 14 arranged on the cross section have the same thickness (t) and the protrusion heights (h). Therefore, the rigidity of the tread portion 2 can be made uniform in the tire circumferential direction. It should be noted that each of the end regions (Ye) includes at least the blade 14 arranged closest to the dividing surfaces (S), and preferably means a region in which a distance from the respective dividing surface (S) is ¼ of a circumferential width (W) of the segment 15.

Figure 8:
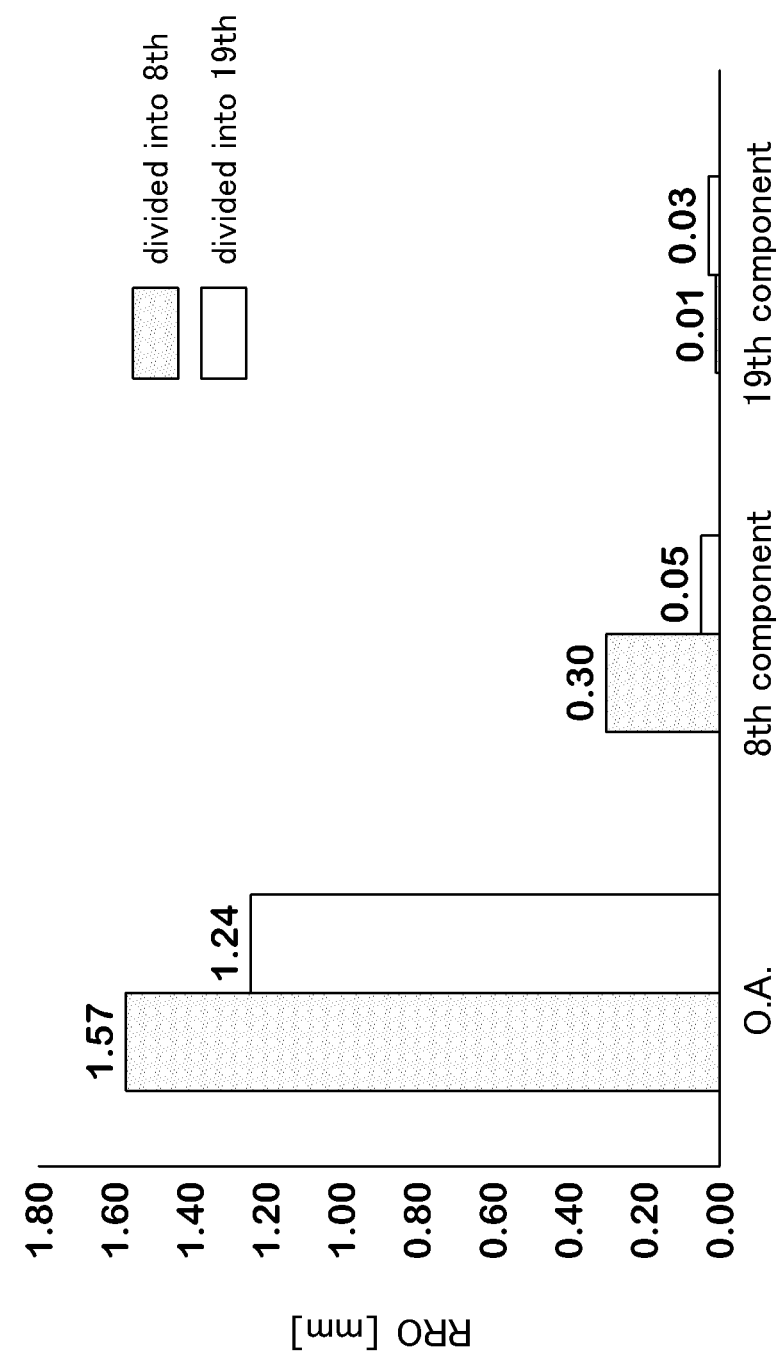
FIG. 8 a graph showing the influence of the number of divisions of the segments on RRO (radial runout) of the tire.

Next, FIG. 8 shows the influence of the number of divisions of the segments 15 on RRO (radial runout) of the tire (T). FIG. 8 shows the uniformity test results performed by the present inventor on 900 tires, and the tread pattern including the thickness and the heights of the blades is substantially the same except that the number of divisions of the segments is different. From the test results, it was found that when the number of divisions was 8, the 8th order component of RRO was as large as 0.30 mm, which may cause uneven wear in the tire circumferential direction. On the other hand, in the case of the tire with the number of divisions being 19, it was found that the O.A. (overall) of RRO and the eighth component of RRO can be significantly decreased while suppressing the increase of the 19th component of RRO. It was also confirmed that this effect was exerted even when the number of divisions was from 17 to 29.

Therefore, by the combination of the effect of largely decreasing O.A. of RRO and the eighth component of RRO and the effect of the blades 14 provided in the segments 15 having the same thickness and the same protruding heights (h), the uneven wear in the tire circumferential direction can be suppressed more effectively.

If the number of divisions is too large, the roundness of the tread portion 2 is deteriorated, therefore, the uniformity is deteriorated, thereby, vibration performance is deteriorated. Further, the workability of assembling the tread mold 10 is deteriorated. Furthermore, when the mold is closed, rubber is entrapped between the dividing surfaces (S), and the larger the number of divisions, the more the rubber entrapments are, which results in deterioration of cleaning workability. From such a point of view, the upper limit of the number of divisions is 29 or less.

It is preferred that the number of divisions is a prime umber. By the number of divisions being a prime number, it is possible to prevent resonance with a low-order component (for example, second component, third component, etc.) due to the internal structure of the tire, such as a carcass or a belt layer. This causes an effect of further suppressing noise, vibration, the uneven wear, and the like.

From such a point of view, it is most preferred that the number of divisions is 19.

Figure 7:
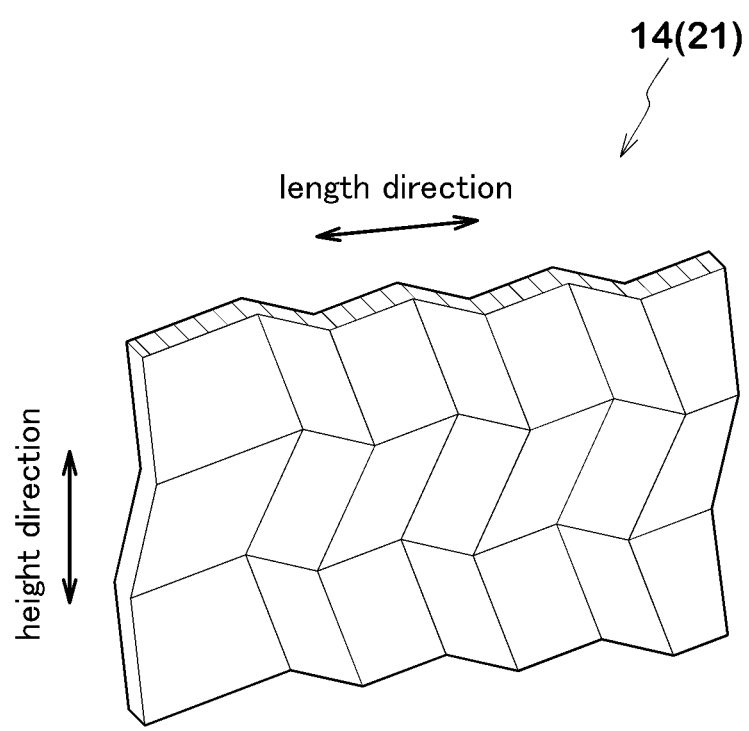
FIG. 7 a perspective view showing an example of the three-dimensional blade.

As conceptually shown in FIG. 7, in the present embodiment, a three-dimensional blade 21 extending in a zigzag shape in the length direction and the height direction of the blade is preferably used as the blade 14. In each of the sipes 3 formed by the three-dimensional blades 21 configured as such, opposing sipe wall surfaces mesh with each other, therefore, collapse of the tread portion 2 is suppressed. As a result, edge effect as well as wear resistance is improved, therefore, the on-ice performance can be improved.

However, with the three-dimensional blades 21, larger force is applied when the blades are removed from the rubber, and therefore damage such as curving and bending is likely to occur. Therefore, the present invention can function more effectively especially for the three-dimensional blades 21 configured as such, and further for the blades 14 having the thickness (t) of 0.6 mm or less, and for the blades 14 each having the height (h) of 15 mm or more.

It should be noted that flat plate-shaped one-dimensional blades, two-dimensional blades each extending in a zigzag shape only in the length direction of the blade, and the like can be used as the blades 14.

Here, in the tire (T), in order to decrease pattern noise, a so-called variable pitch method in which a plurality of pitch elements having different circumferential lengths are randomly arranged in the tire circumferential direction is often used. In this case, each of the segments 15 is further divided into a plurality of pieces.

However, the segments 15 and the pieces are distinguished by the following points. That is, each of the segments 15 individually moves in the tire radial direction along the respective reference line (X). On the other hand, in the case of the pieces, instead of each of the pieces moving individually along the respective reference line (X) in the tire radial direction, each of groups of multiple pieces moves separately along the respective reference line (X) in the tire radial direction.

Figure 9:
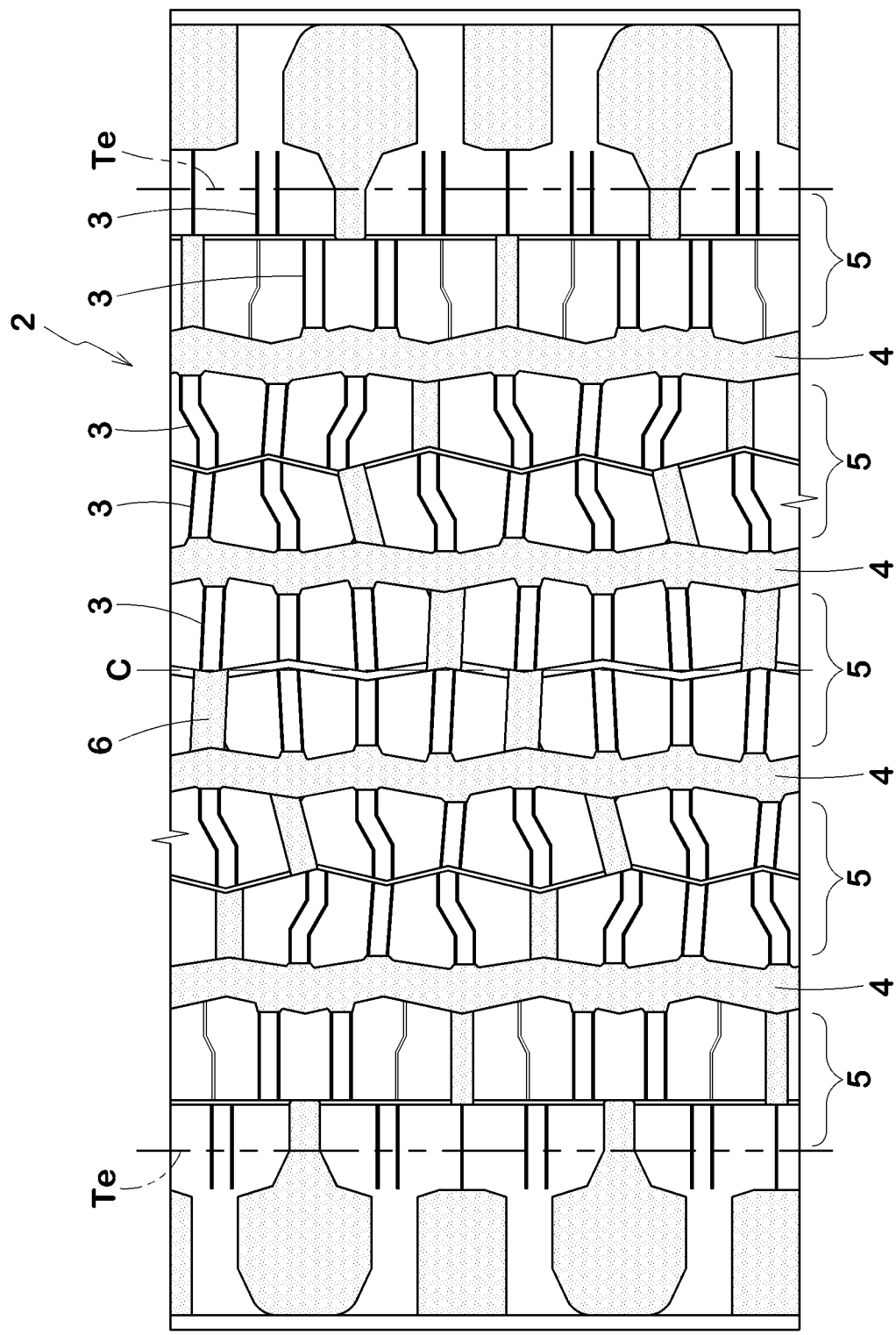
FIG. 9 a development view showing the tread portion of a tire by which the effect of the present invention is exerted more effectively.

FIG. 9 shows a more preferred embodiment of the tire (T) manufactured by using the vulcanization mold 1 of the present invention. This tire (T) is a heavy-duty tire for trucks, buses, and the like, and FIG. 9 shows a development view of the tread portion 2. In heavy-duty tires, each of the heights (h) of the blades 14 from the tread forming surface (10S), which is the depth of each of the sipes 3, is 15 mm or more, or even 17 mm or more, which is significantly higher than that of tires for passenger cars, for example. Therefore, the bending force received from the rubber when the blades 14 are taken out from the tire (T) is significantly larger than that in the case of tires for passenger cars, thereby, damage such as curving and bending is likely to occur. Therefore, from the point of view of exerting the effects of the present invention most effectively, the vulcanization mold 1 of the present invention is most suitable as the vulcanization mold 1 for heavy-duty tires.

While detailed description has been made of an especially preferred embodiment of the present invention, the present invention can be embodied in various forms without being limited to the illustrated embodiments.

Working Examples (Examples)

In order to confirm the effect of the present invention, studless heavy-duty tires (of size 315/80R22.5) having the tread pattern shown in FIG. 9 as the basic pattern were made by way of test by using the vulcanization mold having the blades according to the specification shown in Table 1. References and Examples have substantially the same specifications except for those listed in Table 1. Further, in each of the vulcanization molds, the thickness (t) and the protrusion heights (h) of the blades are equal over the entire circumference of the tire in any cross section passing through the blades and taken parallel to the tire equator.

Then the vulcanized tires were tested for uneven wear resistance performance, roundness, and blade deformability, cost, and workability when the tires were vulcanized.

(1) Uneven Wear Resistance Performance

Vulcanized tires were mounted on all wheels of a 10-ton truck under the conditions of rim size (of 22.5×9.00) and tire inner pressure (of 830 kPa), and the truck was driven for 40,000 km under the condition of being loaded with 50% of the standard loading capacity. After the drive, wear amounts of the tires were inspected and the differences in the wear amounts between the vicinity of positions corresponding to the dividing surfaces of the tread mold and in other parts of the tires were indicated by an index based on Reference 1 being 100. The larger the numerical value, the smaller the difference in the wear amount is, which means better uneven wear resistance performance.

(2) Roundness

The roundness of the vulcanized tires was measured and the results are indicated by an index based on the Reference 1 being 100. The larger the numerical value, the better the roundness is.

(3) Blade Deformability

By using the vulcanization molds, 1000 tires were continuously vulcanization molded for each of the molds. After that, the amounts of deformation of the blades were measured and the results are indicated by an index based on the Reference 1 being 100. The larger the numerical value, the smaller the deformation is, which is better.

(4) Cost

By using the vulcanization molds, 1000 tires were continuously vulcanization molded for each of the molds. After that, the amount of the rubber that was attached to the dividing surfaces due to the rubber entrapments and discarded was measured, and the results are indicated by an index based on the Reference 1 being 100. The larger the numerical value, the smaller the amount of discarded rubber is, which is better.

(5) Workability

Assembling and cleaning of the tread molds were performed and the work time required was measured, and the results are indicated by an index based on the Reference 1 being 100. The larger the numerical value, the shorter the work time is, which is better.

TABLE 1

|  | Ref. 1 | Ref. 2 | Ref. 3 | Ex. 1 | Ex. 2 | Ex. 3 | Ex. 4 |
|---|---|---|---|---|---|---|---|
| Number of divisions of Segments | 8 | 11 | 13 | 17 | 19 | 22 | 23 |
| Blade | Three-dimensional blade (FIG. 7) | | | | | | |
| Thickness (t) [mm] | 0.3 | | | | | | |
| Protruding height (h) [mm] | 18 | | | | | | |
| Uneven wear resistance performance | 100 | 104 | 108 | 112 | 115 | 115 | 115 |
| Roundness | 100 | 99.9 | 99.8 | 99.7 | 99.6 | 99.5 | 99.4 |
| Blade deformability | 100 | 105 | 110 | 115 | 118 | 118 | 118 |
| Cost ( Rubber entrapment) | 100 | 99 | 98 | 97 | 96 | 95 | 94 |
| Workability | 100 | 99 | 98 | 97 | 96 | 95 | 94 |

From the test results, it is confirmed that the vulcanization molds in the Examples can suppress the uneven wear in the tire circumferential direction while suppressing the blade deformation.

DESCRIPTION OF REFERENCE SIGNS

1 vulcanization mold
2 tread portion
3 sipe
10 tread mold 10S tread forming surface
14 blade
15 segment
21 three-dimensional blade
S dividing surface
Ye end region
Yc central region

The invention claimed is:

1. A vulcanization mold for a tire having a tread portion in which a plurality of sipes is arranged in a tire circumferential direction, comprising
a tread mold having a tread forming surface for forming an outer surface of the tread portion and a plurality of blades, for forming the sipes, provided on the tread forming surface, wherein
the tread mold is composed of a plurality of segments divided in the tire circumferential direction by dividing surfaces such that the segments are movable in a tire radial direction as a moving direction,
the number of divisions of the segments is 17 or more and 29 or less, and
in each of the segments, an angle difference between each of the dividing surfaces and the moving direction of the segment is 10.6 degrees or less.

2. The vulcanization mold according to claim 1, wherein in each of the segments, in a cross section passing through the blades and taken parallel with a tire equator, the blades arranged in end regions on the dividing surface sides have the same thickness and the same heights as those of the blades arranged in a central region defined between the end regions.

3. The vulcanization mold according to claim 2, wherein each of the end regions includes at least the blade arranged closest to the respective dividing surface.

4. The vulcanization mold according to claim 2, wherein a circumferential width of each of the end regions from the respective dividing surface is ¼ of a circumferential width of the segment.

5. The vulcanization mold according to claim 1, wherein each of the blades is a three-dimensional blade extending in a zigzag shape in a length direction and a height direction of the blade.

6. The vulcanization mold according to claim 5, wherein in each of the segments, each of heights of the blades is 15 mm or more.

7. The vulcanization mold according to claim 1, wherein each of the blades has thickness of 0.6 mm or less.

8. The vulcanization mold according to claim 7, wherein each of the blades has the thickness of 0.2 mm or more.

9. The vulcanization mold according to claim 1, wherein each of the blades has a height of 13.0 mm or more from the tread forming surface.

10. The vulcanization mold according to claim 9, wherein each of the blades has the height of 15 mm or more from the tread forming surface.

11. The vulcanization mold according to claim 9, wherein each of the blades has the height of 17 mm or more from the tread forming surface.

12. The vulcanization mold according to claim 9, wherein the tread mold has groove forming protrusions, for forming circumferential grooves arranged on the tread portion, provided on the tread forming surface, and
each of the blades has the height not more than each of depths of the circumferential grooves.

13. The vulcanization mold according to claim 1, wherein the number of divisions is a prime number.

14. The vulcanization mold according to claim 1, wherein the number of divisions is 19.

15. The vulcanization mold according to claim 1, wherein each of the segments is movable inward and outward in the tire radial direction along a reference line obtained by connecting a middle position of a circumferential length of the respective segment and a tire axis.

16. The vulcanization mold according to claim 1, wherein the blades are either flat plate-shaped one-dimensional blades or two-dimensional blades each extending in a zigzag shape only in the length direction of the blade.

17. The vulcanization mold according to claim 1, wherein each of the segments is further divided into a plurality of pieces.

18. The vulcanization mold according to claim 17, wherein
the pieces are divided into a plurality of groups,
each of the groups includes a plurality of the pieces,
each of the groups moves separately from other groups in the tire radial direction along a respective reference line, and
the reference line is obtained by connecting a middle position of a circumferential length of the respective segment and a tire axis.

19. A method for manufacturing a tire including a step of vulcanizing a tire by using the vulcanization mold according to claim 1.

20. A vulcanization mold for a tire having a tread portion in which a plurality of sipes is arranged in a tire circumferential direction, comprising
a tread mold having a tread forming surface for forming an outer surface of the tread portion and a plurality of blades, for forming the sipes, provided on the tread forming surface, wherein
the tread mold is composed of a plurality of segments divided in the tire circumferential direction by dividing surfaces such that the segments are movable in a tire radial direction,
the number of divisions of the segments is 17 or more and 29 or less,
in each of the segments, in a cross section passing through the blades and taken parallel with a tire equator, the blades arranged in end regions on the dividing surface sides have the same thickness and the same heights as those of the blades arranged in a central region defined between the end regions, and
in each of the segments, a circumferential width of each of the end regions from the respective dividing surface is ¼ of a circumferential width of the segment.

* * * * *